(12) United States Patent
Shin et al.

(10) Patent No.: US 6,765,655 B1
(45) Date of Patent: Jul. 20, 2004

(54) DATA AQUISITION SYSTEM AND METHOD FOR A LASER DOPPLER ANEMOMETER

(75) Inventors: Hyoun-woo Shin, Cincinnati, OH (US); William C. Groll, North Bend, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/448,865

(22) Filed: May 30, 2003

(51) Int. Cl.[7] .............................................. G01P 3/36
(52) U.S. Cl. ...................................... 356/28.5; 356/28
(58) Field of Search .................................. 356/28.5, 28

(56) References Cited

U.S. PATENT DOCUMENTS

| | | |
|---|---|---|
| 4,974,960 A | 12/1990 | Dopheide et al. |
| 4,997,272 A | 3/1991 | Dopheide et al. |
| 5,875,024 A | 2/1999 | Seelhorst et al. |

OTHER PUBLICATIONS

"Experimental Study of Exhaust System Mixers for A Subsonic Jet Noise Reduction", Shin, et al., AIAA 96–2650, Joint Propulsion Conference, Jul. 1–3, 1996, pp. 1–15.

*Primary Examiner*—Stephen C. Buczinski
(74) *Attorney, Agent, or Firm*—William Scott Andes; Pierce Atwood

(57) ABSTRACT

The present invention provides a system and method for collecting data from a Laser Doppler Anemometer of the type including a probe mounted to a controllable traversing system. Velocity and position data is collected from the probe while it is continuously in motion, and displayed in real time. If at any point the data is of unacceptable quality, the data collection process is stopped, the probe is moved to a last known good position, and the data collection process is restarted.

20 Claims, 2 Drawing Sheets

DATA AQUISITION SYSTEM AND METHOD FOR A LASER DOPPLER ANEMOMETER

BACKGROUND OF THE INVENTION

This invention relates generally to Laser Doppler Anemometers and more particularly to a data acquisition system for a Laser Doppler Anemometer.

Velocity and turbulence measurements of aerospace components and models thereof, such as jet exhaust nozzle models and High Speed Civil Transport (HSCT) exhaust nozzles, have been made using Laser Doppler Anemometer (LDA) systems. LDA systems incorporate the only instrumentation capable of measuring properties at both high temperature and velocity, for example about 610 m/s (2000 ft/s). LDA systems are commercially available but prior art systems are restricted by the inability to obtain data while the laser probe is moving.

Accordingly, there is a need for a LDA system that allows continuous data acquisition.

BRIEF SUMMARY OF THE INVENTION

The above-mentioned need is met by the present invention, which provides a system and method for collecting data from a Laser Doppler Anemometer of the type including a probe mounted to a controllable traversing system. Velocity and position data is collected from the probe while it is continuously in motion, and displayed in real time. If at any point the data is of unacceptable quality, the data collection process is stopped, the probe is moved to a last known good position, and the data collection process is restarted.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
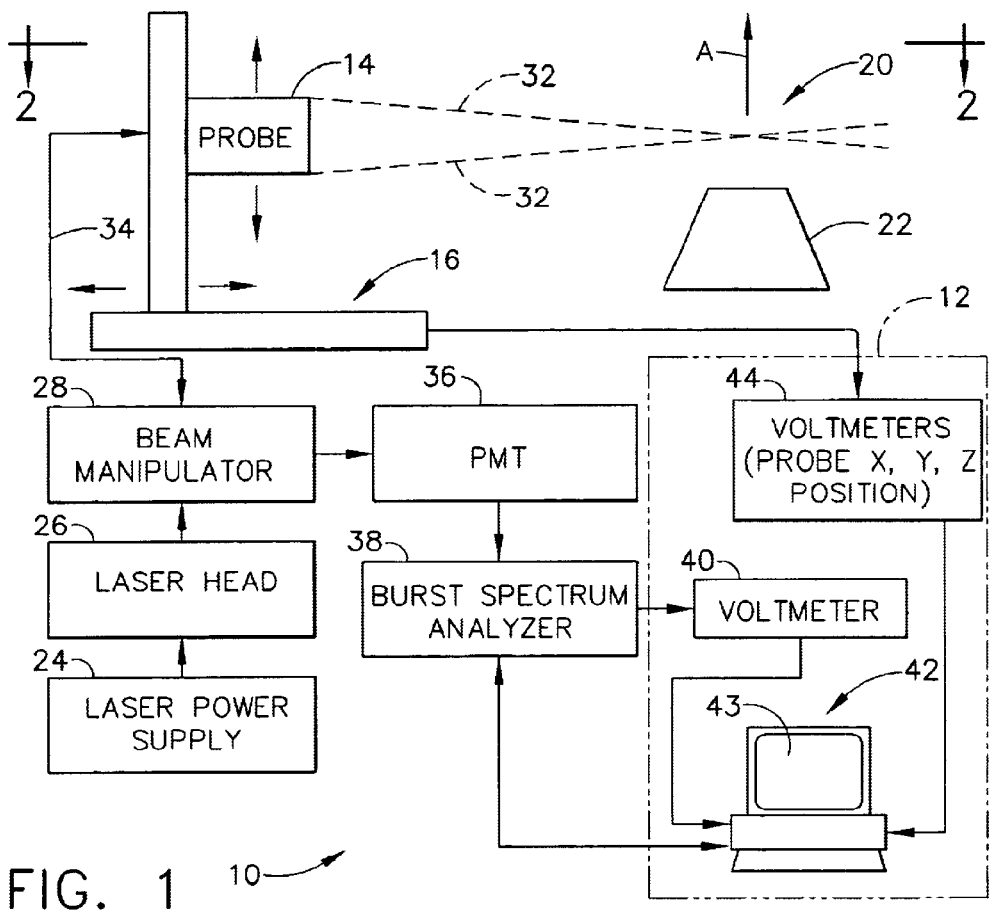
FIG. 1 is a schematic view of a Laser Doppler Anemometer (LDA) system constructed in accordance with the present invention.
Figure 2:
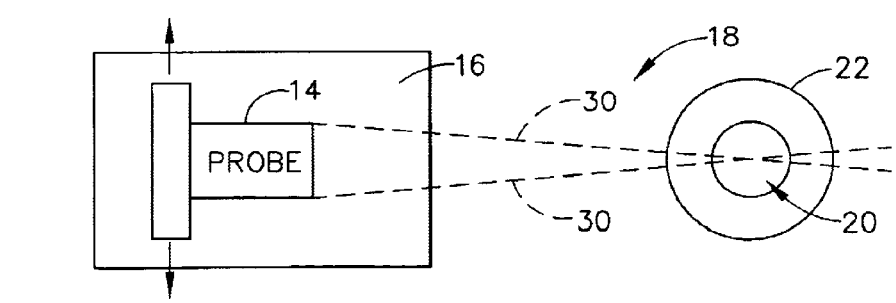
FIG. 2 is a view along lines 2—2 of FIG. 1.

Referring to the drawings wherein identical reference numerals denote the same elements throughout the various views, FIGS. 1 and 2 show an exemplary Laser Doppler Anemometer (LDA) system 10 incorporating the data acquisition system 12 of the present invention. The basic operating principle of an LDA system is well known and will not be described further herein. The exemplary LDA system 10 shown in FIG. 1 is a two-dimensional (2-D) system for measuring two mutually perpendicular velocity components, however it is also possible to use the present data acquisition system with known one-dimensional (1-D) or three-dimensional (3-D) LDA systems. The LDA system 10 includes a probe 14 mounted to a controllable traversing system 16 which allows the probe 14 to be moved along three mutually perpendicular axes as shown by the arrows in FIGS. 1 and 2. Any known type of apparatus which is capable of moving the probe 14 to a desired position and reporting the position may be used, for example, a three-degree-of-freedom sliding support driven by servomotors. The traversing system 16 also incorporates means (not shown) of a known type for determining its position, such as a linear variable differential transformer (LVDT) attached to the movable portion thereof. The probe 14 projects two pairs of opposed laser beams 18, for a total of four beams. The laser beams 18 converge to define a measurement volume 20 at the intersection of the beams 18. The probe 14 is moved by the traversing system 16 so as to position the measurement volume 20 at the desired location. In the illustrated example the measurement volume 20 is shown positioned near the exit of a high speed nozzle 22.

The laser beams 18 are generated by transmitting equipment which includes a laser power supply 24, a laser head 26, and a beam manipulator 28 containing a transmitter and a Bragg cell of a known type (not shown). The laser power supply 24 is of a known type and provides a source of conditioned power to the laser head 26. The laser head 26 is also of a known type, such as a HeNe or Ar Ion laser, which generates a coherent beam of light. The beam from the laser head 26 is supplied to the transmitter in the beam manipulator 28. The transmitter splits the beam into a pair of beams. The frequency of one of the beams is shifted (increased) a selected amount by the Bragg cell. This allows the resolution of the inherent ambiguity between particles moving in opposite directions at the same speed along the same line through the measurement volume 20, in a known manner. The beams are then sent to a color splitter (also enclosed in beam manipulator 28) which splits the beams into two or more colors. In the 2-D system shown the beams are split into blue light at 488 nm wavelength, and green light at 514.5 nm wavelength. The probe 14 transmits a total of four beams: two blue beams 30, one direct and one frequency shifted (see FIG. 2), and two green beams 32, one direct and one frequency shifted.

The illustrated LDA system 10 is of the "backscatter" type. This means that the probe 14, in addition to containing focusing optics for the laser beams, also includes optics (not shown) for receiving laser light scattered from the measurement volume 20. The received light is transmitted through a fiber optic cable 34 to a photomultiplier tube 36 which converts the optical signals (backscattered light) to analog electric signals and amplifies the converted signals. It is noted that the fiber optic cable 34 comprises a single conduit which encloses several single-mode fibers for transmitting the individual beams to the probe 14, and a multi-mode fiber for transmitting the backscattered light to the photomultiplier tube 36. The amplified signal from the photomultiplier tube 36 is sent to a burst spectrum analyzer (BSA) 38. The BSA 38 digitizes the analog signal and processes the signal to obtain a Doppler frequency that is converted to analog electric signals. A digital voltmeter 40 then converts the analog voltage to digital units which may be read, stored, and manipulated by a computer 42 which includes a display 43. The system illustrated in FIG. 1 depicts a single photomultiplier tube 36, BSA 38, and voltmeter 40. In practice, one photomultiplier tube, BSA, and voltmeter are used for each pair of beams 30 and 32. Voltmeters 44 are connected to the traversing system 16 and provide the computer with X, Y, and Z-position information for the probe 14 (and thus the measurement volume 20).

All of the above-described equipment for the LDA system 10 described may be obtained from Dantec Dynamics A/S, Tonsbakken 16-1, P.O. Box 12, DK-2740 Skovlunde, Denmark.

The hardware portion of the LDA system 10 is connected to the computer 42, which can be, but is not necessarily, a desktop PC. The functions described above are directed by control software implemented on the computer 42. The control software performs several functions. The control software acquires the necessary information from the BSA 38 to convert the voltage outputs of the BSA to engineering units via a Digital to Analog (D/A) converter in the BSA 38. The analog signals (voltage outputs) of the blue and green beams from the BSA 38 provide two components of the velocity vector. The control software reads the information via the A/D conversion performed by the voltmeter 40 and decomposes the velocity vector into an axial and perpendicular to axial component of velocity. The control software acquires velocity data from the BSA 38 and probe position information from the traversing system 16 simultaneously while the probe 14 is continuously in transit. The velocities to be measured vary widely, for example about −122 m/s (−400 ft/s) to about 610 m/s (2000 ft/s), corresponding to frequencies of 0 MHz to 100 MHz. However, in some instances the frequency bandwidth of the BSA 38 may only be +/−20 MHz around the center frequency. Therefore, the center frequency of each BSA 38 is adjusted in order to collect a desired range of velocity data. The control software automatically controls the center frequency to the appropriate value.

The control software also generates a display of instantaneous axial velocity distribution versus probe position so the data quality can be verified on-line as it is acquired. The control software allows interruption of the data acquisition process at any point in order to re-take data if data quality is suspect, and then resumes the normal data acquisition process.

The control software stores the data (for example averaged data from a selected number of data points) in a specified data file. The control software also optionally verifies the saved data file quality (for example by comparing the averaged velocity distribution profile to the instantaneous velocity distribution data by plotting the averaged data with instantaneous data together, to compare the goodness of fit of the two).

Figure 3:
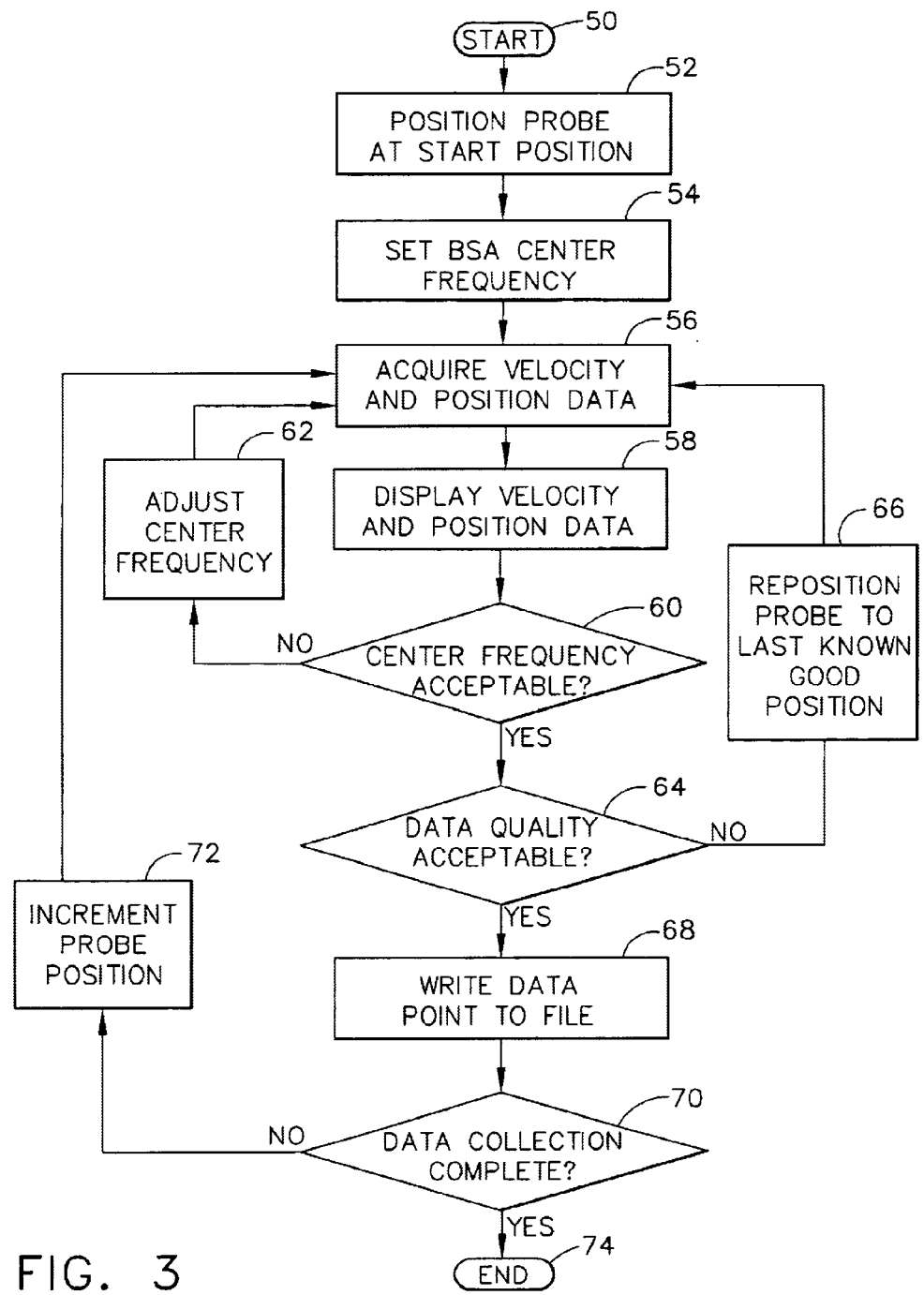
FIG. 3 is a flow chart showing the operation of the LDA control method of the present invention.

The data collection process is illustrated in FIG. 3. The process begins at block 50. The probe 14 is positioned to a starting measurement location at block 52. At block 54, the center frequency of each BSA 38 is set to a starting value, which may be a value corresponding to the predicted fluid velocity to be measured. Velocity and position data are acquired at block 56 using the LDA equipment as described above. The velocity and position data is displayed on the display 43 at block 58, in real-time as it is acquired. At block 60, the velocity data is evaluated to determine if the center frequency of each BSA 38 is acceptable using predetermined criteria. For example, if the velocity data appears to fall outside of +/−80% of the bandwidth limits of the BSA 38 (where 0% corresponds to the center of the bandwidth), then the center frequency is adjusted at block 62 and the collection process begins again at block 56. This cycle is repeated until the data indicates that the center frequency encompasses the velocity data. The center frequency evaluation and adjustment steps may be eliminated if a BSA 38 is used having a sufficient frequency bandwidth to accommodate all possible velocity measurements, but the BSA 38 could lose its resolution. The displayed data quality is evaluated at block 64 to determine if it is of acceptable quality. The data quality can be easily evaluated by looking at the number of incoming data points. Data quality can be considered to be good if the BSA 38 displays a sufficient data rate (e.g., a minimum of 50 data points per second) and the display 43 shows a continuous plot.

If the data quality is deemed to be unacceptable in block 64, the collection process is stopped. The probe 14 is repositioned to the last known position where acceptable data was obtained (see block 66). The collection process is then restarted beginning at block 56. If the data quality is determined to be acceptable in block 64, the data point (position and velocity) is written to a data file at block 68. To save storage capacity, the data may be compressed. For example, instead of storing every data point, the averaged value for a selected number of points may be saved. In one embodiment, the average value of every 20 consecutive data points is permanently stored.

Next, it is determined if the data collection is complete in block 70. For example, the traversing system 16 may be programmed to advance the probe 14 from a starting position to an end position through a plurality of intermediate positions. The completion of the process may be defined as the point at which the probe 14 has been advanced through each of the positions from the starting position to the end position. If the data collection is not complete, then the probe 14 continues its advance to the next position as shown in block 72. The velocity and position data is continuously acquired starting at block 56, as described above. If the data collection is deemed complete at block 70, the process ends at block 74. It is noted that the data collection process may take place while the probe 14 is continuously in motion. That is, the step of incrementing the probe position described in block 72 does not have to be, and is preferably not, a discrete motion of the probe 14. The incrementing step is preferably implemented by simply allowing continuous motion of the probe 14 if the data quality is determined to be acceptable in block 64. The number of individual data points (each comprising a velocity measurement for each probe position) is thus only limited by the resolution of the apparatus used to measure the probe position.

The operation of the control software having been described in detail above, the programming thereof may be readily implemented by one skilled in the art. In an exemplary embodiment the control software of the present system may be programmed in a graphical development application such as LABVIEW virtual instrumentation software, available from National Instruments Corporation, 11500 N. Mopac Expressway, Austin, Tex. 78759 USA. The control software may also be programmed in any other known software language that allows the control of instrumentation hardware.

The foregoing has described a LDA system that allows continuous data acquisition. While specific embodiments of the present invention have been described, it will be apparent to those skilled in the art that various modifications thereto can be made without departing from the spirit and scope of the invention as defined in the appended claims.

What is claimed is:

1. A method of collecting data from a Laser Doppler Anemometer, comprising the following steps:

providing a Laser Doppler Anemometer including a probe mounted to a controllable traversing system for moving said probe;

moving said probe to a starting position;

acquiring data in the form of at least two data points, each of said data points comprising velocity data from said probe and position data from said traversing system, while continuously moving said probe from a starting position through a plurality of intermediate positions to an ending position; and while performing said step of acquiring said data, displaying said data and determining if said data is of acceptable quality or unacceptable quality for each position based on predetermined criteria.

2. The method of collecting data of claim 1 further comprising:

in response to a determination that said data is of unacceptable quality, stopping said step of acquiring velocity and position data, moving said probe to a last known good position where said data was determined to be of acceptable quality, and restarting said step of acquiring velocity and position data beginning at said last known good position.

3. The method of collecting data of claim 1 wherein said predetermined criteria is that an individual data point differs from and estimated value of said data point by more than a predetermined amount.

4. The method of collecting data of claim 1 further including storing at least a portion of said data.

5. The method of collecting data of claim 4 wherein the data stored comprises the average value of a selected number of consecutive data points.

6. The method of collecting data of claim 5 wherein the selected number of consecutive data points is about 20.

7. The method of collecting data of claim 1 wherein said Laser Doppler Anemometer includes a burst spectrum analyzer having an adjustable center frequency and a fixed bandwidth, said method further comprising adjusting said center frequency so that said bandwidth encompasses said velocity data.

8. A computer-readable medium containing instructions for controlling a Laser Doppler Anemometer system having a probe mounted to a controllable traversing system to perform a data collection method, said method comprising:

moving said probe to a starting position;

acquiring data in the form of at least one data point, each of said data points comprising velocity data from said probe and position data from said traversing system, while continuously moving said probe from a starting position through a plurality of intermediate positions to an ending position; and while performing said step of acquiring said data, displaying said data and determining if said data is of acceptable quality or unacceptable quality for each position based on predetermined criteria.

9. The computer-readable medium of claim 8 wherein said instructions further cause said Laser Doppler Anemometer system, in response to a determination that said data is of unacceptable quality, to stop said step of acquiring velocity and position data, move said probe to a last known good position where said data was determined to be of acceptable quality, and restart said step of acquiring velocity and position data beginning at said last known good position.

10. The computer-readable medium of claim 8 wherein said predetermined criteria is that a particular data point differs from an estimated of said data point by more than a predetermined amount.

11. The computer-readable medium of claim 8 wherein said instructions further cause said Laser Doppler Anemometer system to store at least a portion of said data.

12. The computer-readable medium of claim 11 wherein the data stored comprises the average value of a selected number of consecutive data points.

13. The computer-readable medium of claim 12 wherein the selected number of consecutive data points is about 20.

14. The computer-readable medium of claim 8 wherein said Laser Doppler Anemometer system includes a burst spectrum analyzer having an adjustable center frequency and a fixed bandwidth, said medium further containing instructions for adjusting said center frequency so that said bandwidth encompasses said velocity data.

15. A data collection system for a Laser Doppler Anemometer, comprising:

a Laser Doppler Anemometer including a probe mounted to a controllable traversing system for moving said probe;

a computer which acquires position and velocity data from said Laser Doppler Anemometer while said probe is continuously in motion and displays said data in human-readable form as it is received, said computer including means responsive to a determination that said data is of unacceptable quality, wherein said means stop acquiring said velocity and position data, move said probe to a last known good position where said data was determined to be of acceptable quality, and continues acquiring velocity and position data beginning at said last known good position.

16. The data collection system of claim 15 wherein said predetermined criteria is that a particular data point differs from an estimated value of said data point by more than a predetermined amount.

17. The data collection system of claim 16 further including means for storing at least a portion of said data.

18. The data collection system of claim 17 wherein the data stored comprises the average value of a selected number of consecutive data points.

19. The data collection system of claim 18 wherein the selected number of consecutive data points is about 20.

20. The data collection system of claim 15 wherein said Laser Doppler Anemometer includes a burst spectrum analyzer having an adjustable center frequency and a fixed bandwidth, said system further including means for adjusting said center frequency so that said bandwidth encompasses said velocity data.

* * * * *

UNITED STATES PATENT AND TRADEMARK OFFICE
CERTIFICATE OF CORRECTION

PATENT NO. : 6,765,655 B1 Page 1 of 1
DATED : July 20, 2004
INVENTOR(S) : Hyoun-woo Shin et al.

It is certified that error appears in the above-identified patent and that said Letters Patent is hereby corrected as shown below:

Column 6,
Line 6, "an estimated of" should be -- an estimated value of --.

Signed and Sealed this

Sixteenth Day of November, 2004

JON W. DUDAS
*Director of the United States Patent and Trademark Office*